(12) United States Patent
Stol et al.

(10) Patent No.: US 6,264,810 B1
(45) Date of Patent: Jul. 24, 2001

(54) ELECTROMECHANICAL ATTACHMENT OF INERT ELECTRODE TO A CURRENT CONDUCTOR

(75) Inventors: Israel Stol, Pittsburgh; S. John Pien, Export; Robert W. Woods, New Kensington; Rabindra K. Bhattcharyya, Murrysville, all of PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/461,484

(22) Filed: Dec. 14, 1999

(51) Int. Cl.[7] .................................................. B23H 3/04
(52) U.S. Cl. ............................ 204/286.1; 204/288.1; 204/288.4; 204/288.5; 204/297.01; 204/297.13; 204/297.15; 204/279
(58) Field of Search ...................... 204/286.1, 288.1, 204/288.4, 288.5, 297.01, 297.13, 297.15, 279, 289

(56) References Cited

U.S. PATENT DOCUMENTS

| | | | |
|---|---|---|---|
| 4,450,061 | 5/1984 | Rolf | 204/286 |
| 4,457,811 | 7/1984 | Byrne | 204/60 |
| 4,468,298 | 8/1984 | Byrne et al. | 204/60 |
| 4,468,299 | 8/1984 | Byrne et al. | 204/60 |
| 4,468,300 | 8/1984 | Byrne et al. | 204/60 |
| 4,626,333 | * 12/1986 | Secrist et al. | 204/288.4 |

* cited by examiner

*Primary Examiner*—Bruce F. Bell
(74) *Attorney, Agent, or Firm*—David C. Jenkins; Edward L. Levine

(57) ABSTRACT

A coupling for an inert electrode for refining a metal is provided. The coupling includes an electrode assembly and an electrically conductive support structure assembly. The support structure assembly includes a mechanical connection and an electrical connection which are in spaced relation. The mechanical connection holds the electrical connection in compression.

33 Claims, 10 Drawing Sheets

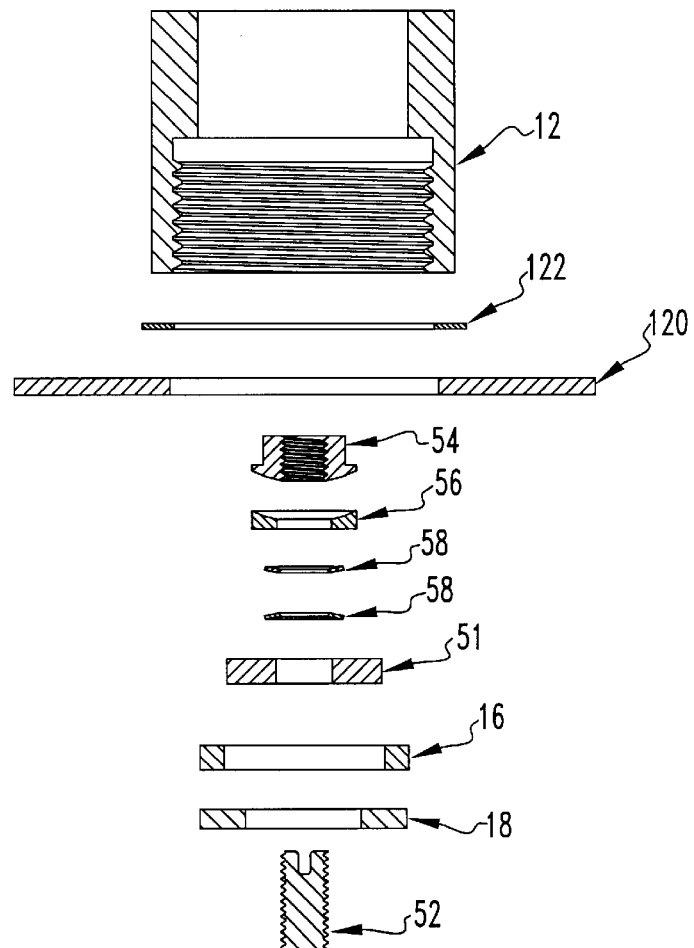
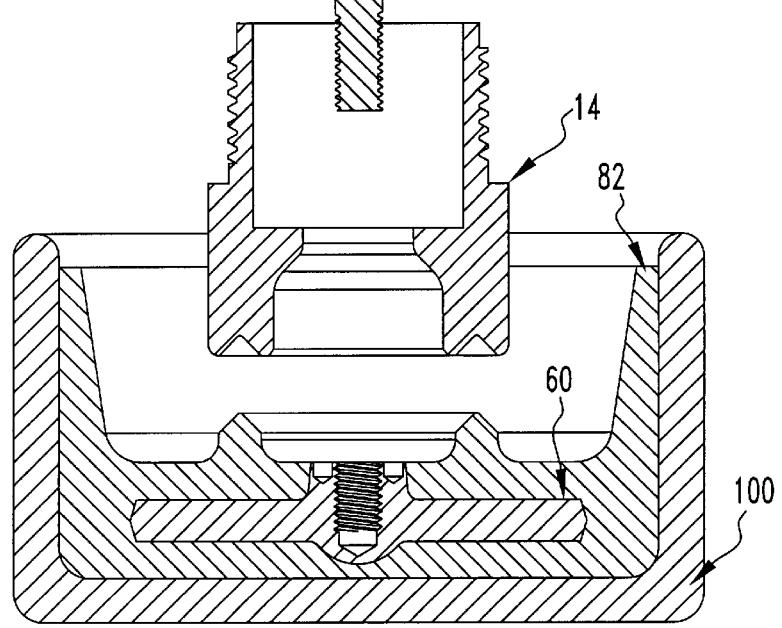
FIG. 2

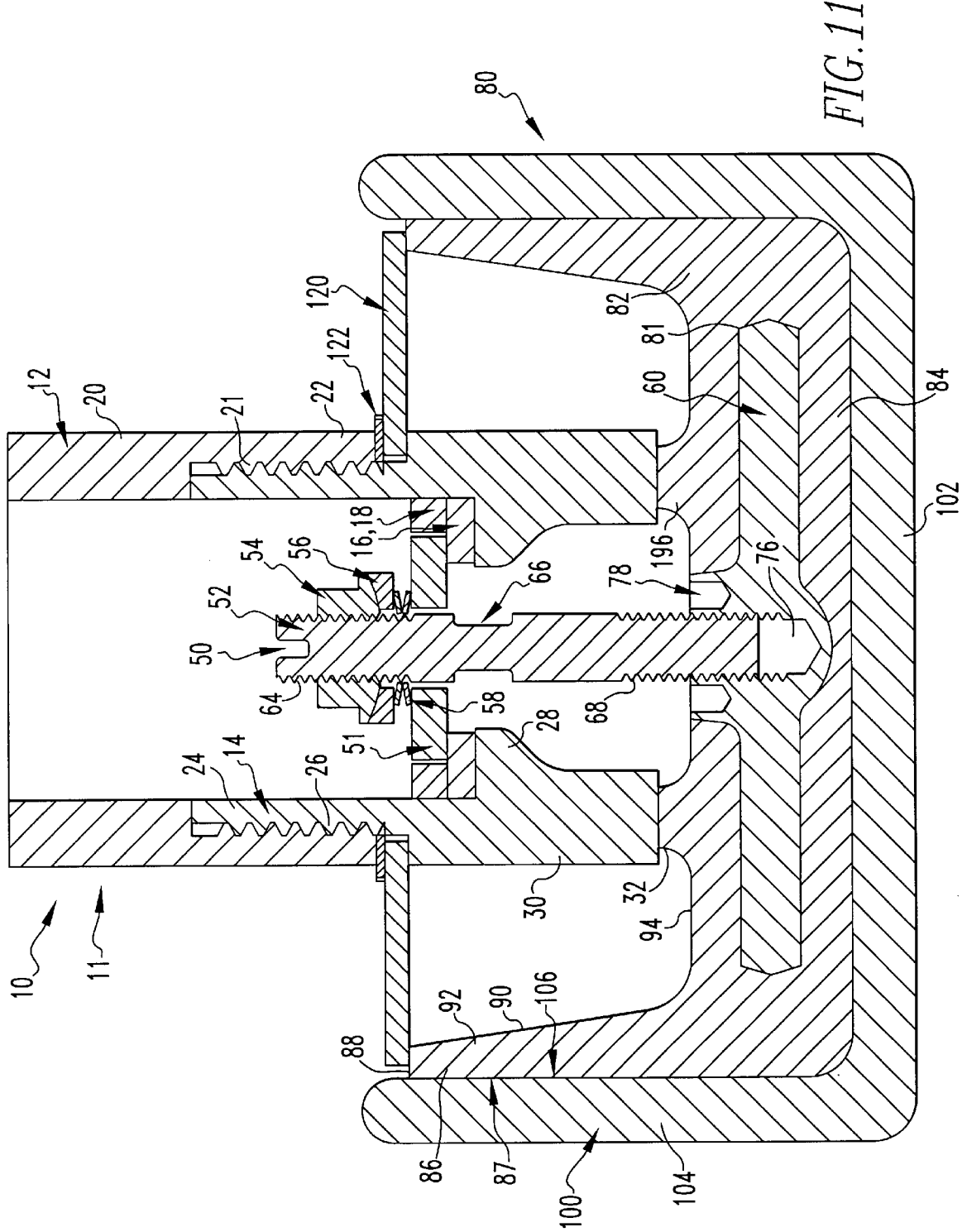

ELECTROMECHANICAL ATTACHMENT OF INERT ELECTRODE TO A CURRENT CONDUCTOR

FIELD OF THE INVENTION

This invention relates to a coupling for an inert electrode and a current conductor and, more specifically, to a coupling having separate electrical and mechanical connections, where the mechanical connection holds the electrical connection in compression.

BACKGROUND OF THE INVENTION

A number of materials including metals such as aluminum, lead, magnesium, zinc, zirconium, titanium and silicon, for example, can be produced by electrolytic processes. Although individual processes may vary in some respects from one to another, each employs the use of an electrode which must operate in a highly corrosive environment.

An example of such a process for the production of metal is the well-known Hall-Heroult process (hereinafter referred to as the Hall process) for producing aluminum in which alumina dissolved in a molten fluoride salt bath is electrolyzed at temperatures from 900° C. to 1000° C. In the process as generally practiced today, carbon is used as an electrode to reduce the alumina, and the reduction produces molten aluminum, and the carbon is oxidized to primarily form $CO_2$ which is given off as a gas. Despite the common usage of carbon as electrode material in practicing the Hall process, there are a number of disadvantages to its use.

Since carbon is consumed in relatively large quantities in the Hall process, approximately 420 to 550 kg per ton of aluminum produced, the electrode must be constantly repositioned or replenished to maintain the proper spacing with the cathode in the cell to produce aluminum efficiently. If prebaked electrodes are used, it may be seen that a relatively large facility is needed to produce sufficient electrodes to operate an aluminum smelter. Furthermore, to produce the purity of aluminum required to satisfy primary aluminum standards, the electrode must be relatively pure carbon, and availability and cost of raw materials to make the carbon are of increasing concern to aluminum producers.

Because of the disadvantages inherent in the use of carbon as an electrode, there has been a continuing search for inert or nonconsumable materials that can operate as an electrode with a reasonable degree of electrochemical efficiency and withstand the high temperature and extremely corrosive environment of the molten salt bath. Some inert electrode materials are disclosed in U.S. Pat. Nos. 4,374,050, 4,374,761, 4,399,008, 4,455,211, 4,582,585, 4,584,172, 4,620,905, 5,794,112 and 5,865,980 and U.S. application Ser. No. 09/241,518, filed Oct. 3, 2000, now U.S. Pat. No. 6,126,799 which are assigned to the assignee of this Application and which are incorporated by reference. The material described therein which can be used to form a non-consumable electrode is a cermet.

One problem in the development and use of non-consumable electrodes for producing aluminum by electrolysis has been developing an electrical and mechanical attachment to connect the non-consumable electrode to an electrical source. In a typical operation of a Hall cell using carbon as the electrode, the electrode is formed into a block having a rectangular cross section and a metallic rod or bar is embedded therein by providing a hole in the block, inserting the rod in the hole and filling the void between the rod and the block with molten iron. When the iron solidifies, it shrinks tightly around the bar and away from the hole surfaces of the carbon block, but disengagement is prevented by adapting the block so as to engage the solidified iron. Such an adaptation is providing recesses in the hole sidewall to form a mechanical lock. When the above-described assembly is positioned in a Hall cell having a salt bath which is maintained at approximately 1000° C., the rod, cast iron and carbon in the connection zone rise in temperature from room temperature to approximately 700° to 800° C. The rod and cast iron expand more than the carbon in the connection zone and create a substantially tight and reasonably efficient electrical and mechanical connection.

When using carbon as the electrode body, it is desirable that it be in a block form because it is consumed during the electrolytic process and a large block or mass minimizes the frequency with which electrodes must be replaced. Additionally, the carbon materials are typically better conductors of electricity than are ceramic materials used in inert electrodes. When materials such as cermet are used for electrode bodies, however, such a connection is not necessarily satisfactory for a number of reasons. It is not desirable, for example, to provide a cermet electrode in a large mass or block because, typically, ceramic electrode bodies are more expensive to make than are carbon electrode bodies. Cermet bodies are also subject to cracking and damage. Because of this, and because of the conductivity of cermet, a cermet electrode will typically be formed by disposing a layer of cermet on a conductive material core. To operate, the core must be attached to a current conductor. Because the cermet electrode is not depleted as quickly as a carbon electrode, the former iron rod type connection is not desirable. For an electrode which will be used for an extended period, e.g. 12 months to 24 months, the connection should be adapted for long term use, as well as maintenance operations, and function to maintain the integrity of the ceramic material when subjected to temperature differentials on the order of 1000° C.

Additionally, as shown in U.S. Pat. No. 4,468,300 to Byrne et al., U.S. Pat. No. 4,468,298 to Byrne et al., U.S. Pat. No. 4,457,811 to Byrne, and U.S. Pat. No. 4,450,061 to Rolf prior art electromechanical connections provide an electrode which hangs from the connection causing the electrical connection to be in tension. An electrical connection between a conductive metal and a ceramic or cermet material performs more efficiently while in compression.

SUMMARY OF THE INVENTION

This invention provides an electromechanical connection coupling a nonconsumable inert electrode to an electric source. The coupling is adapted for long term use by providing separate mechanical and electrical connections. The coupling includes a mechanical anchor which is coupled to the conductive core and which provides mechanical support for the core. The coupling further includes a separate electrical connection between a main conductor and the core. The mechanical connection holds the electrical connection in compression.

While it is possible to provide an electrode with separate structures for an electrical connection and mechanical support, it is more efficient to have a single structure. Therefore, this invention further provides a single support structure which includes separate electrical and mechanical connections for an inert electrode.

This invention further provides for an electromechanical connection coupling a non-consumable inert electrode to an electric source wherein the electromechanical connection is in compression in the immediate vicinity of the electrical connection

BRIEF DESCRIPTION OF THE DRAWINGS

A full understanding of the invention can be gained from the following description of a preferred embodiment when read in conjunction with the accompanying drawings in which:

FIG. 2 is an exploded cross sectional view of a coupling according to the present invention.

FIG. 11 is a cross sectional view of a coupling according to another embodiment of the present invention.

DESCRIPTION OF A PREFERRED EMBODIMENT

For convenience, a preferred embodiment of this invention will be described with reference to an electrode assembly for producing aluminum by an electrolytic process. It is to be understood, however, that the scope of this invention is intended to include its use in producing other metals by electrolysis as well.

Figure 1:
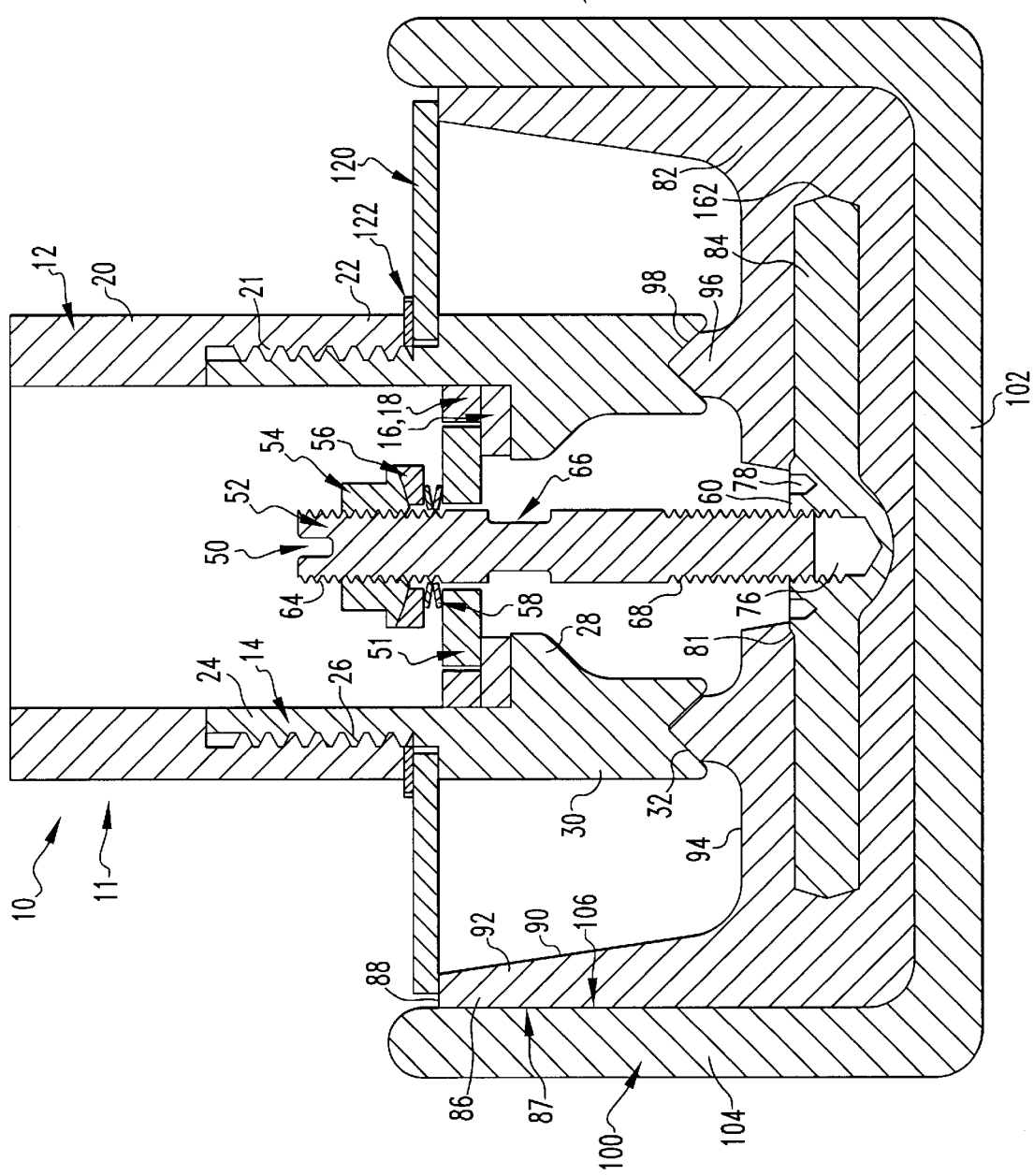
FIG. 1 is a cross sectional view of a coupling according to the present invention.

An electromechanical attachment to couple an inert electrode to a current conductor according the present invention is shown in FIGS. 1 and 2. The attachment includes a support structure assembly 10 and an electrode assembly 80. The support structure assembly 10 may be made of a conductive material such as Iconel 600™, and is coupled to a bus bar or current conductor (not shown). In a preferred embodiment, the support structure 10 includes an electrical connector assembly 11 and a mechanical anchor assembly 50. Electrical connector assembly 11 includes an adaptor 12 coupled to the current conductor (not shown), a conductor sleeve 14, and a plurality of insulator sleeves 16, 18. The adaptor 12 is a hollow member having a circular cross section with an upper portion 20, internal threads 21, and a lower portion 22. Conductor sleeve 14 is a hollow member having a circular cross section which is smaller than the cross sectional area of adaptor 12. Conductor sleeve 14 includes an upper portion 24, external threads 26 on upper portion 24, internal medial ledge 28 and a lower portion 30. Sleeve lower portion 30 includes a doubled tapered female electrical connection 32 which contacts the core double tapered male electrical connection 98 (described below). Conductor sleeve 14 and adaptor 12 are coupled by the respective threaded portions 26, 21. Insulator sleeves 16, 18 are each a rectangular toroid which are supported by a medial ledge 28.

The mechanical anchor assembly 50 includes a clamping plate 51, a threaded rod 52, a spherical nut 54, a spherical washer 56, a pair of belleville washers 58 and an anchor member 60. Clamping plate 51 is a rectangular toroid. Threaded rod 52 includes an upper slot 62, an upper threaded portion 64, a medial wrench flat 66, and a lower threaded portion 68. Threaded portions 64, 68 are counter tapped so that rotating threaded rod 52 will cause members engaged with threaded portions 64, 68 to be simultaneously drawn toward, or away from, the center of threaded rod 52 depending on the direction of rotation.

Figure 3:
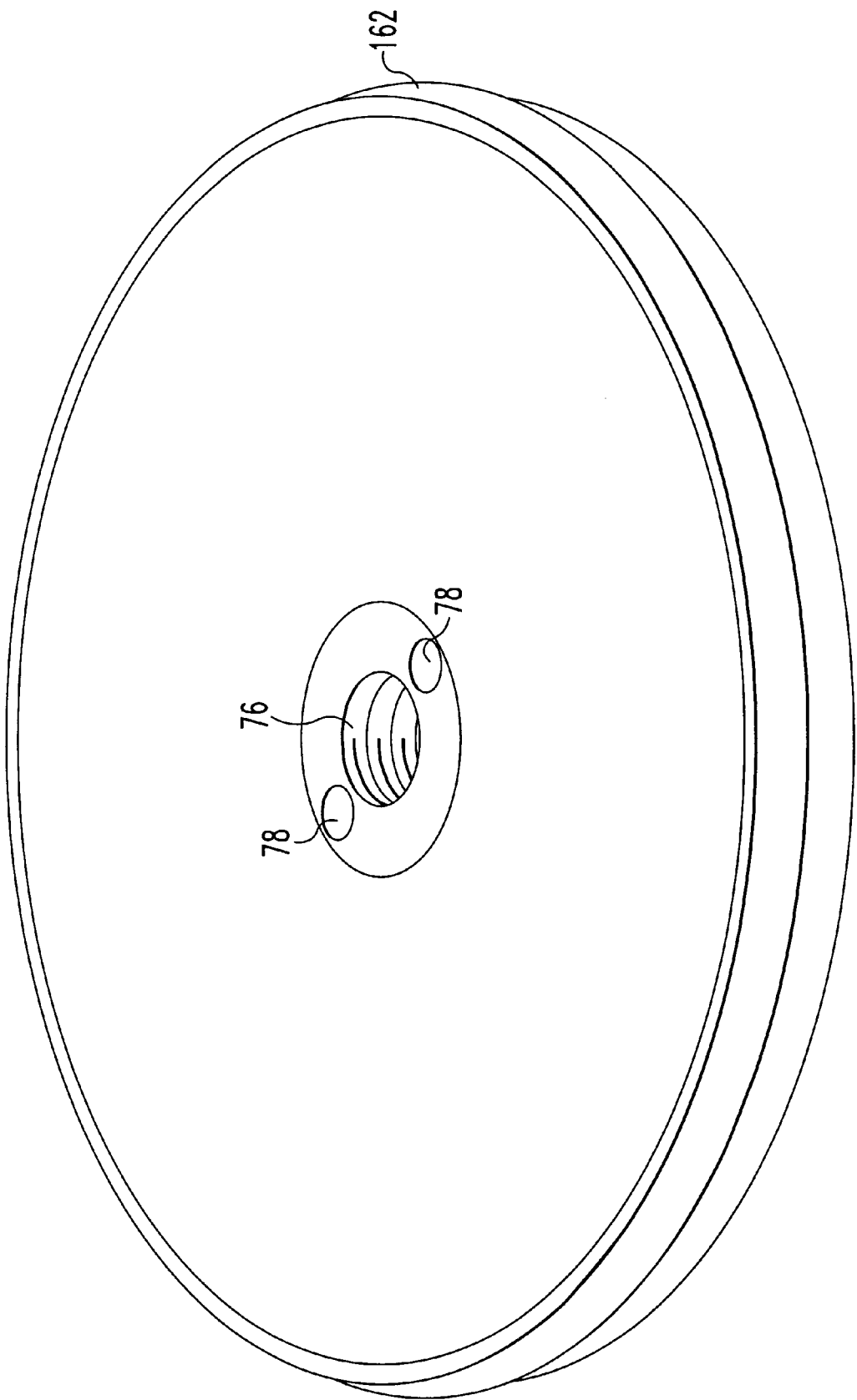
FIG. 3 is a perspective view of the anchor.
Figure 4:
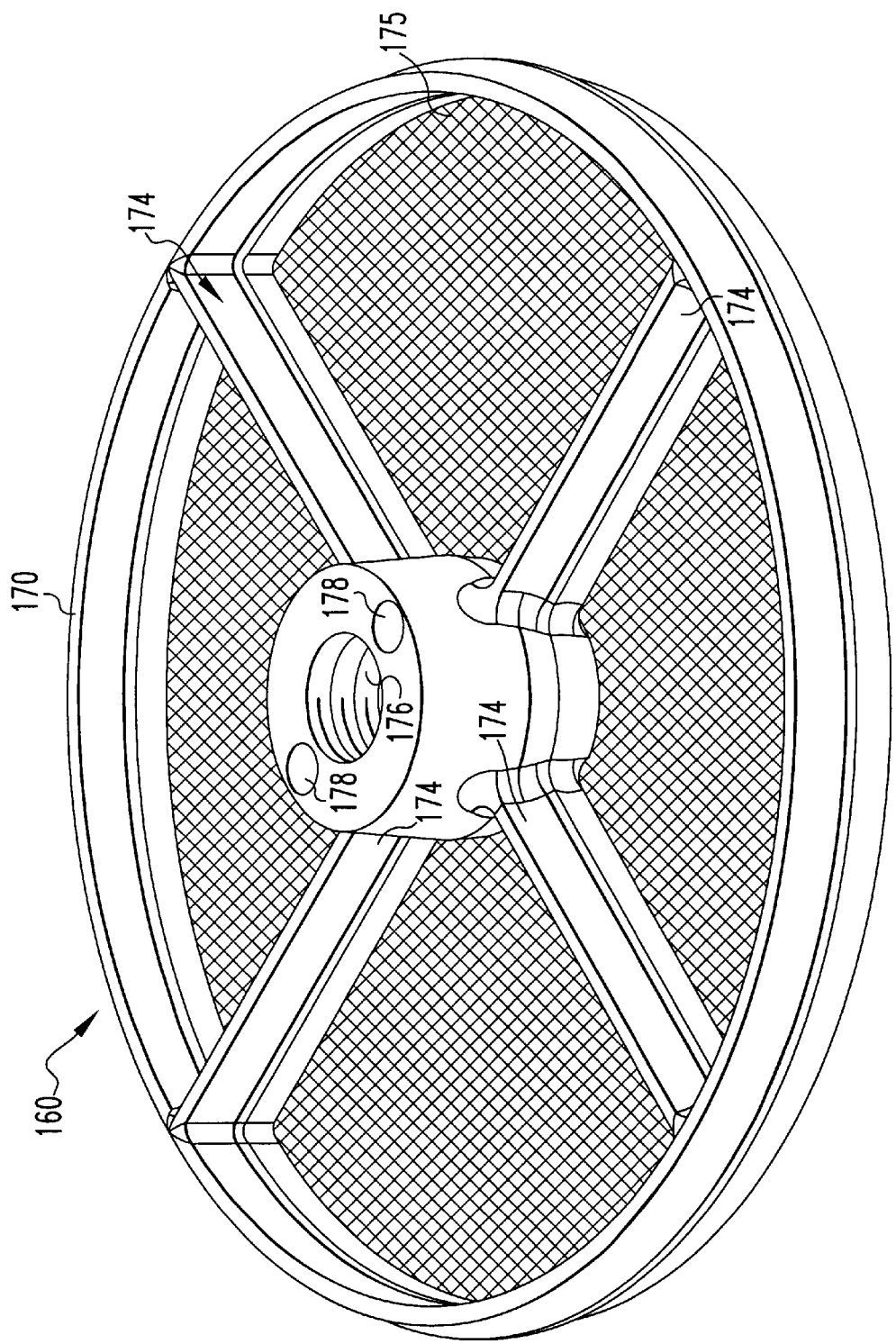
FIG. 4 is a perspective view of another embodiment of the anchor.

Because the electrode assembly 80 is made from a brittle material (as described below), anchor member 60 preferably does not have any sharp edges. By avoiding sharp edges the mechanical anchor assembly 50 avoids causing localized stresses on the electrode assembly 80. The anchor member, as shown in FIG. 3, may be shaped as an extended disk or cylinder 60 having a double tapered edge 162. The anchor 60 includes a threaded medial opening 76 which is sized to be coupled with rod threaded portion 68. The disk 60 may have a plurality of wrench holes 78. There may also be a web (not shown) of Iconel or steel mesh extending from the disk 60. An alternate embodiment is shown in FIG. 4, where anchor member 160 is a hub 172 having a plurality of spokes 174. The spokes 174 may, or may not, be attached to an outer torrid 170. There may also be a web 175 of Iconel or steel mesh disposed between the spokes 174. The hub 172 may have a threaded opening 176 and a plurality of wrench holes 178. This shape also evenly distributes the weight of the electrode assembly 80 (described below).

Figure 5:
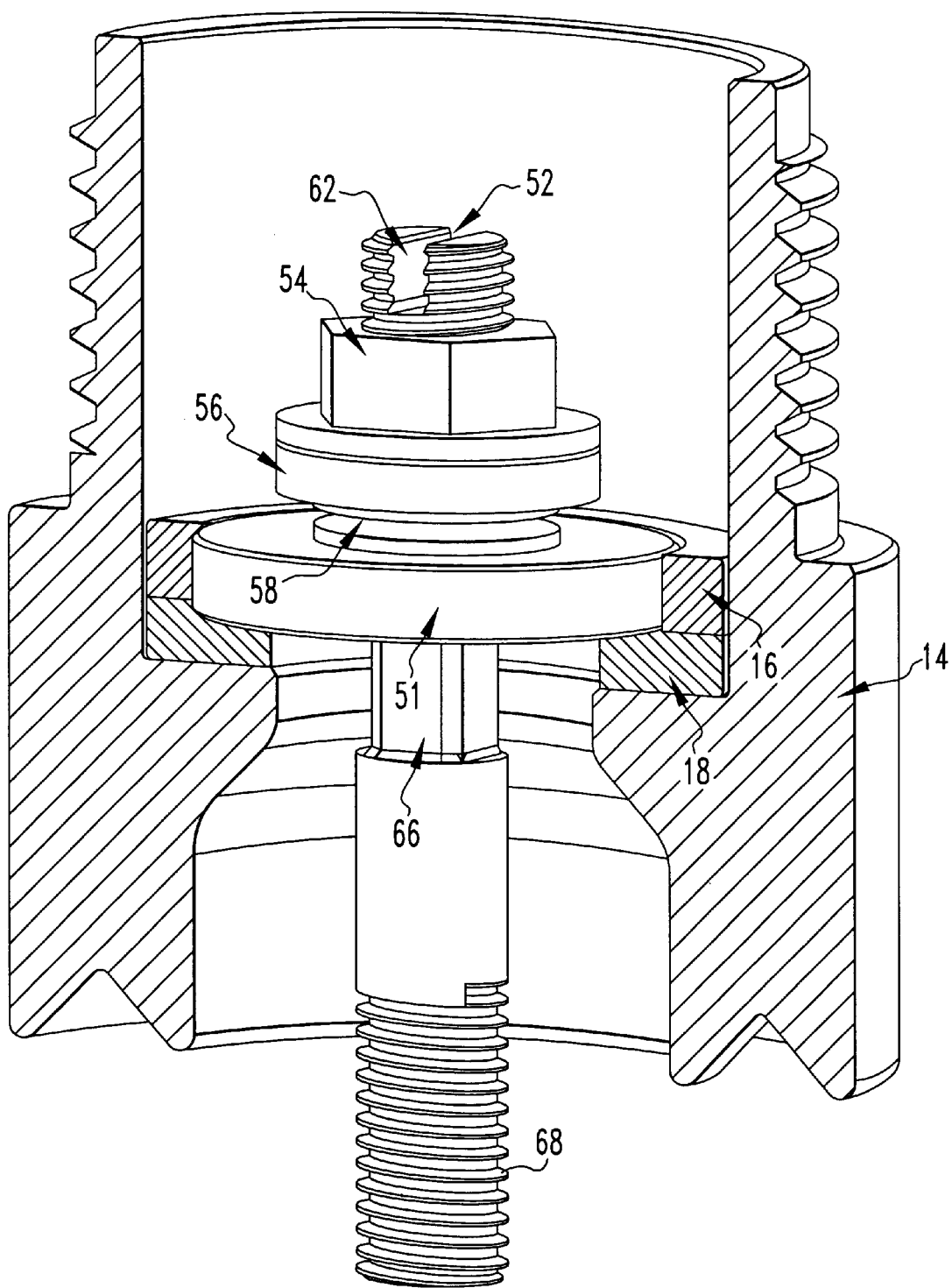
FIG. 5 is a partial cross sectional perspective view of the top of the anchor assembly.

As shown in FIG. 5, when assembled, clamping plate 51 is disposed on insulator sleeves 16, 18. Threaded rod 52 passes through the opening in clamping plate 51. Spherical nut 54 engages upper threaded portion 64. Spherical washer 56 and belleville washers 58 are disposed between spherical nut 54 and clamping plate 51. Medial wrench flat 66 and lower threaded portion 68 extend downwardly below clamping plate 51. As shown in FIG. 1, threaded opening 76 of anchor 60 engages lower threaded portion 68.

The electrode assembly 80 may be made of a single material, such as cermet, however, in a preferred embodiment, as shown in FIG. 1, electrode assembly 80 includes a conductive core 82 and an outer shell 100 made of cermet (as described below). The core 82 is preferably a cermet material having between about 17% and 28% copper by weight and, more preferably 27% copper by weight. The core 82 is a cylindrical cup having a bottom wall 84, a medial cavity 81 within bottom wall 84, and a sidewall 86. Bottom wall 84 and side wall 86 have an outer surface 87. Sidewall 86 has a flat upper surface 88 and an interior surface 90. Interior surface 90 includes a tapered surface 92 opposite the sidewall 86 and generally horizontal surface 94 adjacent to bottom wall 84. Horizontal surface 94 includes an annular ridge 96. Annular ridge 96 terminates in a double tapered male electrical connection 98. Annular ridge 96 is sized to have the same radius as double tapered female electrical connection 32. Thus, when electrode assembly 80 is disposed on support structure assembly 10, double tapered female electrical connection 32 will contact the core double tapered male electrical connection 98. The height of the double tapered connection is, preferably, between about ten to fifteen millimeters.

Anchor member 60 is disposed within cavity 81. To accommodate the different rates of thermal expansion of the core 82 and the anchor member 60, an expansion space 83, shown in FIG. 6, extends between anchor member 60 and core 82. The anchor 60 may be made from materials with coefficients of thermal expansion which are equal or smaller than the core materials such as Inconel 600™ or Inconel 617™, Core 82 is created from a ceramic powder containing 27% copper and may be simultaneously sintered with cermet shell 100. Preferably, anchor member 60 is pre-formed prior to being inserted into the powder of core 82 before core 82 is sintered. However, the anchor member 60 may also be created by introduction of a metal power within the core powder. The metallic powder is consolidated into the anchor member 60 during sintering. Threaded opening 76 is then tapped into anchor member 60 after sintering.

To create expansion space 83, the anchor member 60 may be coated with a material, such as poly-vinyl alcohol, PVA, celluloid, or plastic, which will disintegrate during the sintering process. The coated anchor member 60 is then inserted into core 82. As core 82 is sintered with the cermet shell 100, the coating material on anchor member 60 disintegrates leaving expansion space 83 around anchor member 60. After sintering is complete, the powder containing 27% copper which forms the core 82 will be converted into a ceramic.

Outer shell 100 is also made of cermet material. The outer shell 100 is preferably a cermet material having between about 83% and 85% nickel ferrite by weight and, more preferably 84% nickel ferrite by weight. The outer shell 100 has a bottom wall 102, a sidewall 104, and an inner surface 106. Outer shell sidewall 104 extends above core sidewall upper surface 88. Outer shell inner surface 106 contacts, and is in electrical communication with, substantially all of core outer surface 87.

Figure 6:
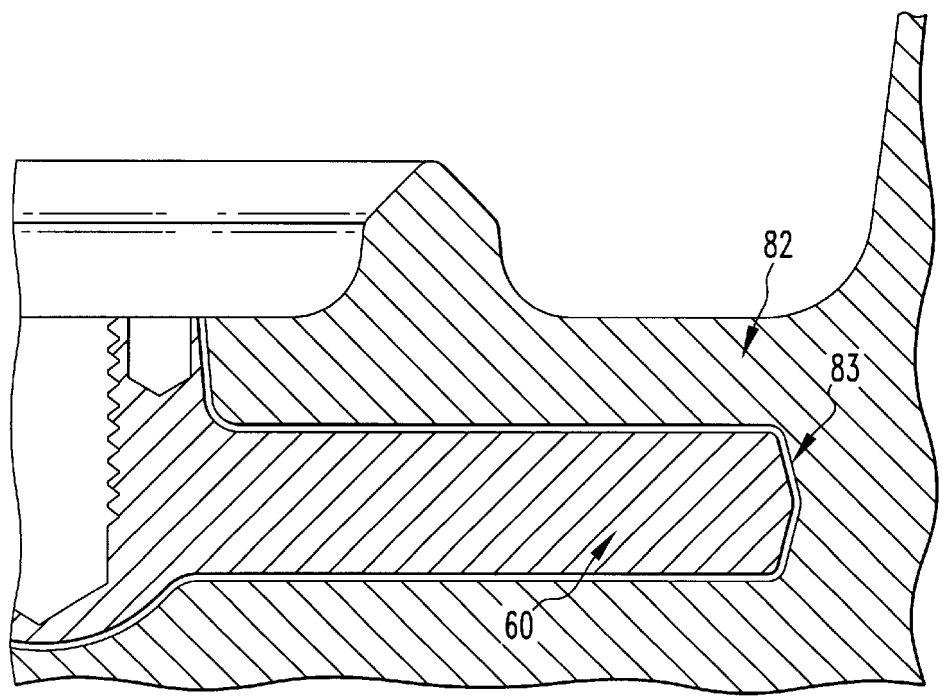
FIG. 6 is a partial cross sectional view of the core and anchor showing the expansion space.
Figure 7:
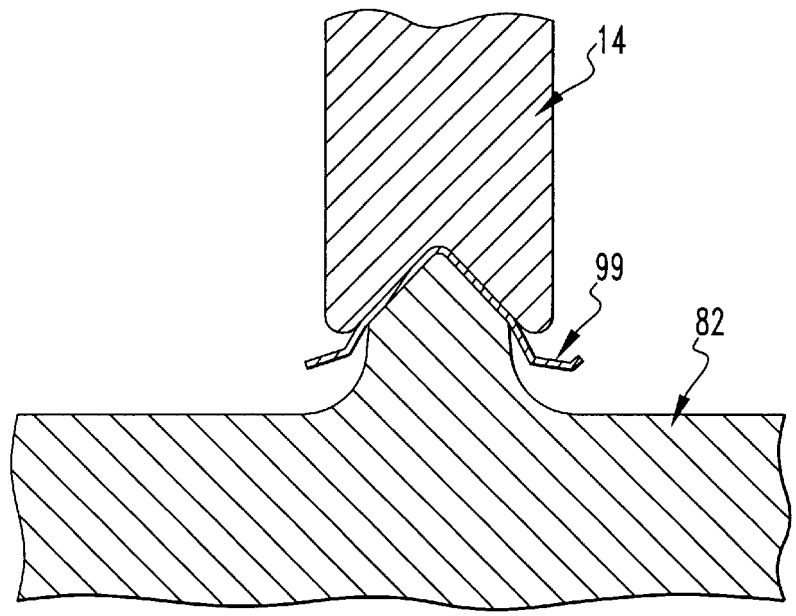
FIG. 7 is a detail cross sectional view showing an alternate embodiment of the electrical connection.

To assemble the coupling, threaded rod 52 is engaged with anchor threaded opening 76. The threaded rod 52 may be tightened in anchor member 60 by a wrench engaging wrench flats 66. The threaded rod 52, now coupled to the electrode assembly 80, is inserted through the medial opening in clamping plate 51. Belleville washers 58, spherical washer 56 and spherical nut 54 are then coupled to threaded rod upper portion 64, which is above clamping plate 51. Then, spherical nut 54 is rotated about threaded rod 52. Because the threaded portions 64, 68 of rod 52 are counter taped rotating rod 52 will draw anchor member 60 upwards, causing double tapered male electrical connection 98 to engage doubled tapered female electrical connection 32, at the same time, spherical washer 56 is drawn downward, biasing clamping plate 51 against insulator sleeves 16, 18. Because insulator sleeves 16, 18 are between the conductor sleeve 14 and anchor member 60, current does not flow from the current conductor through anchor 60. Instead, current flows through the double tapered electrical connections 32, 98. Thus, the anchor assembly 50 provides mechanical support for the electrode assembly 80, while the electrical connection is through double tapered male electrical connection 98 and doubled tapered female electrical connection 32. The double tapered electrical connections 32, 98 provide a greater area for the electrical interface than a flat surface for the electrical connection. As shown in FIG. 6, the electrical interface may be enhanced with a conductive material 99 such as nickel mesh. Additionally, when the electrode assembly 80 is drawn toward the support structure 10, the electrical interface is in compression. Ceramic material, such as core 82 performs better under compression. The electrical connection may further be secured by other common means such as, but not limited to, welding, e.g. flash welding or friction welding, the electrical connections 32, 98.

Figure 8:
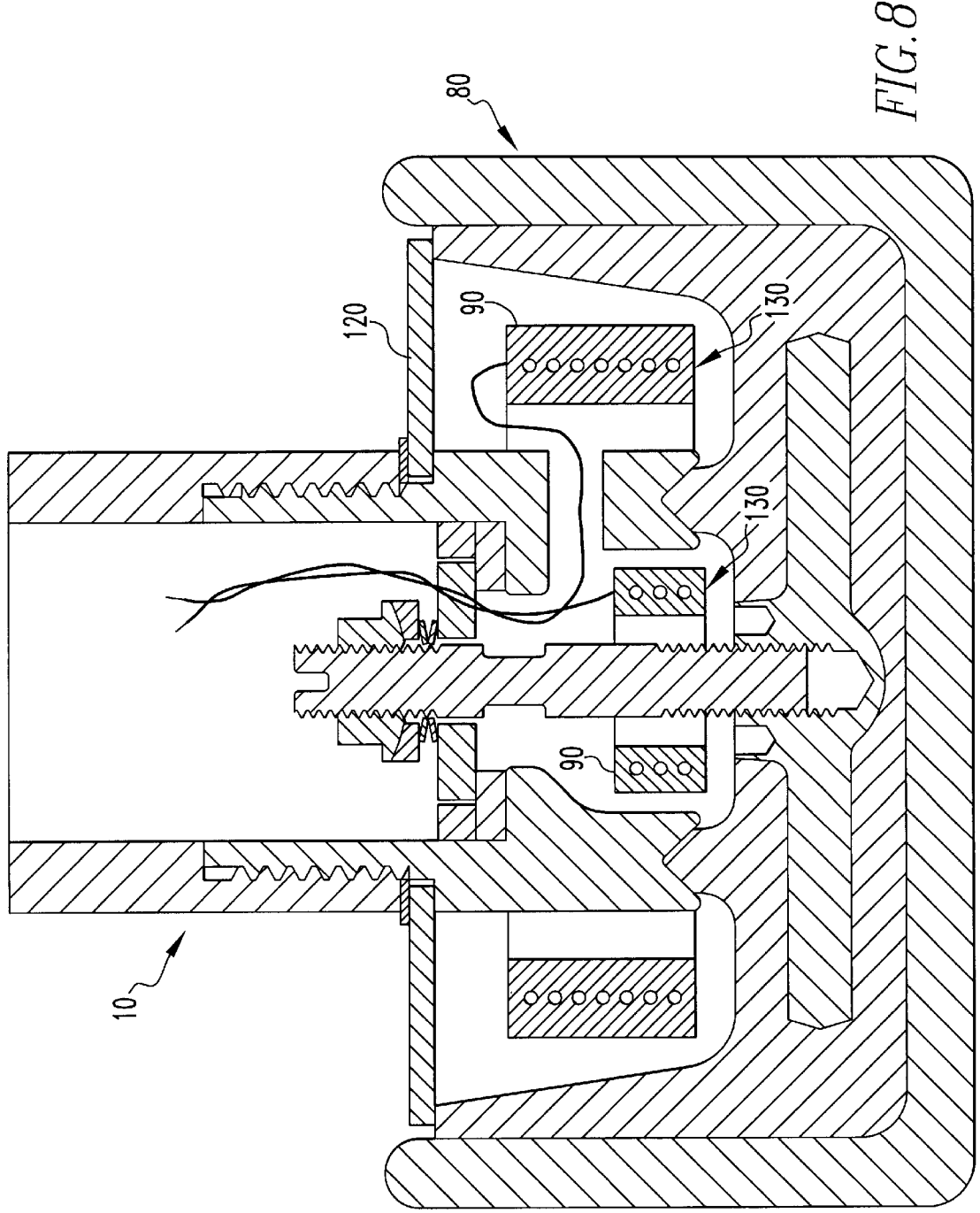
FIG. 8 is a cross sectional view of a coupling according to another preferred embodiment of the present invention which includes heaters.

A cover 120 may be disposed between core flat upper surface 88 and conductor sleeve 14 to reduce the amount of liquid from the molten fluoride salt bath which may be splashed and/or condensed onto interior surface 90. An additional gasket 122 may be provided between adaptor 12 and cover 120 to further reduce the infiltration of liquid from the salt bath. Additionally, should the electrode assembly 80 need to be heated, at least one heater 130 may be placed in the space defined by interior surface 90 and cover 120, as show in FIG. 8.

Figure 9:
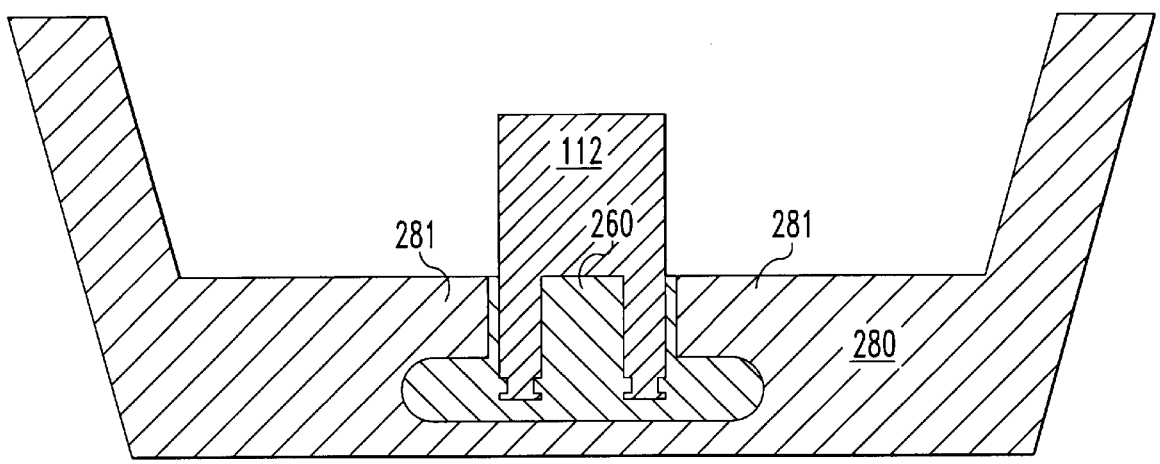
FIG. 9 is a cross sectional view of another embodiment of the coupling.

In the embodiments described above, the mechanical and electrical connections are in compression. As shown in FIG. 9, the electromechanical attachment to couple an inert electrode to a current conductor may also be formed from an integrated electromechanical coupling having a anchor member 260 disposed between an electrical conductor 112 and an electrode assembly 280. The anchor member 260 is imbedded in a electrode assembly 280. In this configuration, a portion 281 of the electrode assembly 280 rests on anchor 260. Thus, a portion of the electrical connection is in compression due to the weight of the electrode assembly 280 acting on anchor 260.

Figure 10:
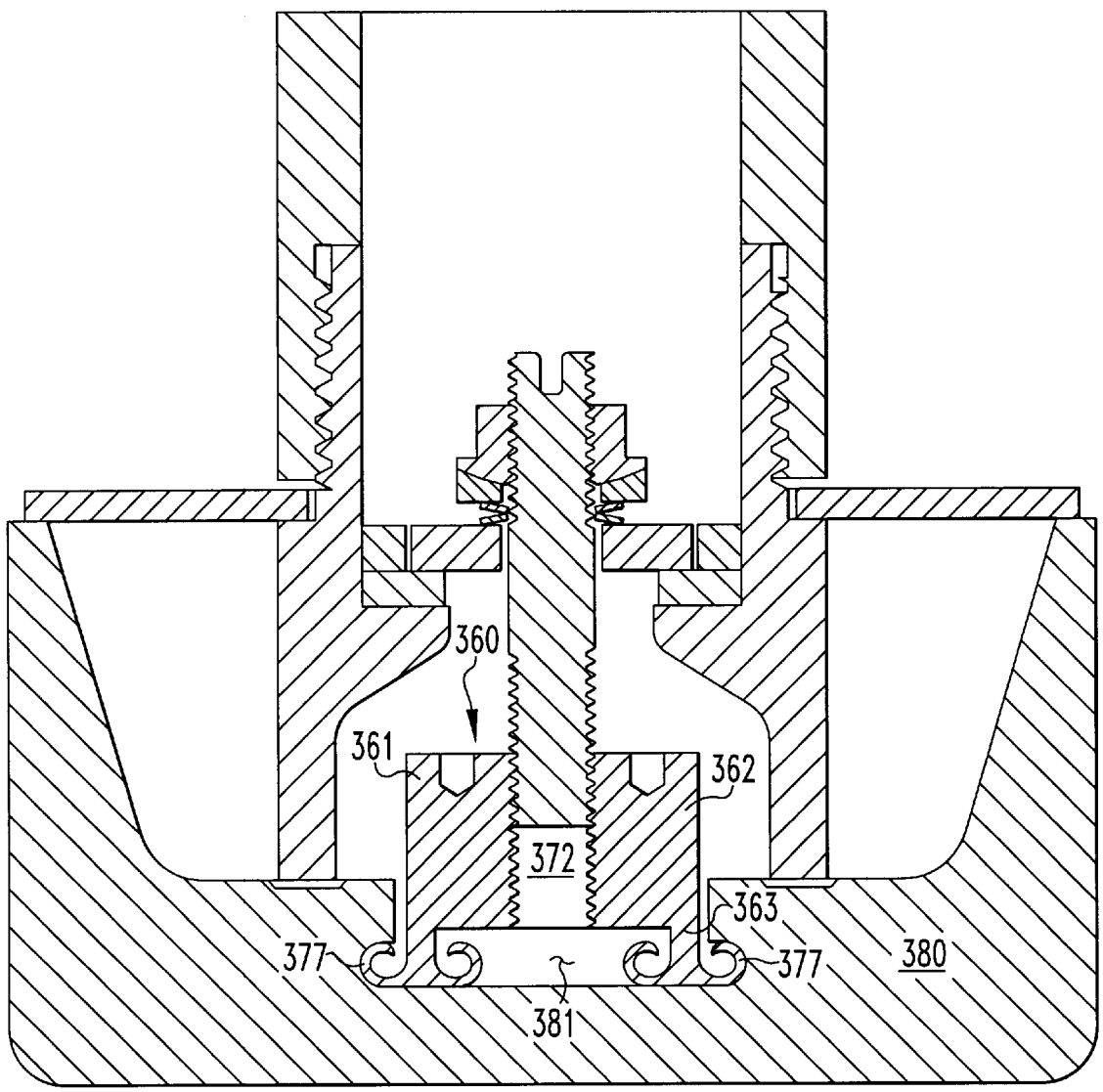
FIG. 10 is a cross sectional view of a coupling according to another embodiment of the present invention.

As shown in FIG. 10, the geometry of the anchor member 60 may be altered. In this embodiment, the anchor member 360 may be formed from a cylinder 361 having a solid upper portion 362 and a hollow lower portion 363. A threaded opening 372 is included in the solid upper portion 362. An electrode assembly 380 is provided with a cavity 381 having a rounded outer surface. When the hollow lower portion 363 is agitated and pressed against electrode assembly 380, preferably within cavity 381, in a process similar to friction welding, the lower portion 363 will be heated until lower portion 363 deforms into tabs 377. Cavity 381 may be shaped to accommodate tabs 377.

While specific embodiments of the invention have been described in detail, it will be appreciated by those skilled in the art that various modifications and alternatives to those details could be developed in light of the overall teachings of the disclosure. For example, as shown in FIG. 10, the electrical connection may include an annular ridge 196 that terminates with a flat surface 132 rather than the previously discussed double tapered connection 32. The electrical connection at the interface between the ridge 196 and the flat surface may be further secured by such means as friction welding. Accordingly, the particular arrangements disclosed are meant to be illustrative only and not limiting as to the scope of invention which is to be given the full breadth of the claims appended and any and all equivalents thereof.

What is claimed is:

1. A coupling for an inert electrode for refining a metal, said coupling comprising:
   an electrode assembly;
   an electrically conductive support structure assembly coupled to said electrode assembly, said support structure assembly comprising a mechanical connection and a separate electrical connection;
   said mechanical connection and said electrical connection are in a spaced relation to each other; and
   said mechanical connection holds said electrical connection in compression.

2. The coupling of claim 1, wherein said electrode assembly comprises a cermet material.

3. The coupling of claim 2, wherein said electrical connection comprises:
   an annular ridge having a flat edge on said electrode assembly; and a flat connection on said support structure assembly;
   where said annular ridge flat edge is contacting said support structure flat edge connection.

4. The coupling of claim 3, wherein said electrode assembly is welded to said support structure assembly at said electrical connection.

5. The coupling of claim 1, wherein said mechanical connection comprises a mechanical anchor assembly and said electrical connection comprises a double tapered female connection.

6. The coupling of claim 5, wherein said electrode assembly has a cavity and an upper surface, said mechanical connection coupled to said electrode assembly at said cavity, said electrical connection coupled to said electrode assembly upper surface.

7. The coupling of claim 6, wherein said upper surface includes a double tapered male connection, and wherein said mechanical anchor assembly is disposed in said cavity and said double tapered female connection contacts said double tapered male connection.

8. The coupling of claim 7, wherein said electrode assembly comprises a cermet material.

9. The coupling of claim 1, wherein said electrode assembly includes an electrical connection and a mechanical connection;

said electrode assembly coupled to, and supported by, said support structure assembly mechanical connection, said electrode assembly coupled to, and in electrical communication with, said support structure assembly electrical connection.

10. The coupling of claim 9, wherein said electrode assembly has a weight and said support structure mechanical connection includes an anchor assembly having an anchor member;

said anchor member is shaped to uniformly distribute said weight of said electrode assembly.

11. The coupling of claim 10, wherein said anchor comprises a disk having a double tapered edge.

12. The coupling of claim 11, wherein said disk has a medial opening having a threaded surface; and said anchor assembly includes a threaded rod;

said anchor is coupled to said support structure by said threaded rod.

13. The coupling of claim 12, wherein said electrode assembly includes an outer shell and a core;

said outer shell is in electrical communication with said core.

14. The coupling of claim 13, wherein said core is bowl shaped having a bottom wall, and upwardly extending side wall coupled to said bottom wall and an interior cavity within said bottom wall;

said anchor is disposed within said interior cavity; and said male double tapered connection is disposed on said core.

15. The coupling of claim 14, wherein said core bottom wall and side wall have an outer surface;

said outer shell has an inner surface;

said outer shell inner surface overlays and is in electrical communication with, said core outer surface.

16. The coupling of claim 15, wherein said outer shell comprises a cermet material.

17. The coupling of claim 16, wherein a conductive material is disposed between said double tapered male connection and said double tapered female connection.

18. The coupling of claim 17, wherein a cover is disposed between said support structure and said electrode assembly defining a space between said cover and said core and said cover.

19. The coupling of claim 18, wherein at least one heater is disposed in said space defined by said cover and said electrode assembly.

20. The coupling of claim 10, wherein said anchor comprises an outer toroid, a hub, and a plurality of spokes, said spokes coupling said hub to said outer toroid.

21. The coupling of claim 20, wherein said inner toroid has a medial opening having a threaded surface; and said anchor assembly includes a threaded rod;

said anchor is coupled to said support structure by said threaded rod.

22. The coupling of claim 21, wherein said support structure is a hollow cylindrical tube having an inner ledge;

said threaded rod coupled to said ledge.

23. The coupling of claim 22, wherein said threaded rod includes a first threaded portion and a second threaded portion;

said second threaded portion is engaged with said anchor; and said first threaded portion coupled to said support structure.

24. The coupling of claim 23, wherein said anchor assembly includes:

clamping ring; and a nut;

said nut engaged with said first threaded portion;

said nut coupled to said clamping ring, biasing said clamping ring against said support structure ledge.

25. The coupling of claim 24, wherein said anchor assembly includes a spherical washer; and where said nut is a spherical nut;

said washer disposed on said threaded rod between said spherical nut and said clamping ring.

26. The coupling of claim 25, wherein said anchor assembly includes a plurality of insulator sleeves;

said sleeves disposed between said clamping ring and said support structure.

27. The coupling of claim 26, wherein said electrode assembly includes an outer shell and a core;

said outer shell is in electrical communication with said core.

28. The coupling of claim 27, wherein said core is bowl shaped having a bottom wall, and upwardly extending side wall coupled to said bottom wall and an interior cavity within said bottom wall;

said anchor is disposed within said interior cavity; and said male double tapered connection is integral to said core.

29. The coupling of claim 28, wherein said core bottom wall and side wall have an outer surface;

said outer shell has an inner surface;

said outer shell inner surface overlays and is in electrical communication with, said core outer surface.

30. The coupling of claim 29, wherein said outer shell is made of cermet.

31. A method of coupling an inert electrode assembly to a current conductor comprising the steps of:

providing an inert electrode assembly;

providing an electrically conductive support structure assembly comprising a separate mechanical connection and an electrical connection;

coupling said electrode assembly to said support structure assembly so that said mechanical connection holds said electrical connection in compression.

32. The method of claim 31, wherein said mechanical connection includes a threaded rod and said coupling step includes rotating said treaded rod until said electrical connection is in compression.

33. A method of coupling an inert electrode assembly to a current conductor comprising the steps of:

providing a inert electrode assembly having a mechanical connection and an electrical connection;

providing an electrically conductive support structure assembly having a mechanical connection and an electrical connection;

coupling said electrode assembly to said support structure assembly so that said mechanical connection holds said electrical connection in compression.

* * * * *

UNITED STATES PATENT AND TRADEMARK OFFICE
CERTIFICATE OF CORRECTION

PATENT NO. : 6,264,810 B1
DATED : July 24, 2001
INVENTOR(S) : Israel Stol et al.

It is certified that error appears in the above-identified patent and that said Letters Patent is hereby corrected as shown below:

<u>Column 8,</u>
Line 61, delete "treaded" and insert -- threaded --.

Signed and Sealed this

Sixteenth Day of May, 2006

JON W. DUDAS
*Director of the United States Patent and Trademark Office*